United States Patent [19]
Courtney et al.

[11] Patent Number: 5,203,510
[45] Date of Patent: Apr. 20, 1993

[54] DUAL ROTARY IMPELLER BROADCAST SPREADERS

[75] Inventors: Steve P. Courtney, Westerville; James D. Amerine, Marysville, both of Ohio

[73] Assignee: The O. M. Scott & Sons Company, Marysville, Ohio

[21] Appl. No.: 884,053

[22] Filed: May 14, 1992

Related U.S. Application Data

[63] Continuation-in-part of Ser. No. 635,214, Dec. 28, 1990, abandoned.

[51] Int. Cl.$^5$ ............................................. A01C 17/00
[52] U.S. Cl. .................................. 239/667; 239/682; 239/685; 239/687
[58] Field of Search ............... 239/665, 666, 667, 687, 239/682, 685, 673

[56] References Cited

U.S. PATENT DOCUMENTS

| | | | |
|---|---|---|---|
| 3,539,113 | 11/1970 | Tyler | 239/667 |
| 4,106,704 | 8/1978 | McRoskey et al. | 239/685 |
| 4,548,362 | 10/1985 | Doering | 239/685 |
| 4,597,531 | 7/1986 | Kise | 239/685 |
| 4,867,381 | 9/1989 | Speicher | 239/685 |
| 5,018,669 | 5/1991 | van der Lely et al. | 239/665 |

FOREIGN PATENT DOCUMENTS 29346  11/1957  Finland ............................. 239/665

Primary Examiner—Andres Kashnikow
Assistant Examiner—Lesley D. Morris
Attorney, Agent, or Firm—Jones, Day, Reavis & Pogue

[57] ABSTRACT

A spreading device is disclosed including two impellers mounted to rotate in rotational correspondence about their axes toward one another as the device is moved in a forwardly advancing direction so as to broadcast particulate materials deposited thereon in a controlled distribution pattern along a predetermined distribution path generally in the direction of advancement of the device onto a selected target area.

27 Claims, 7 Drawing Sheets

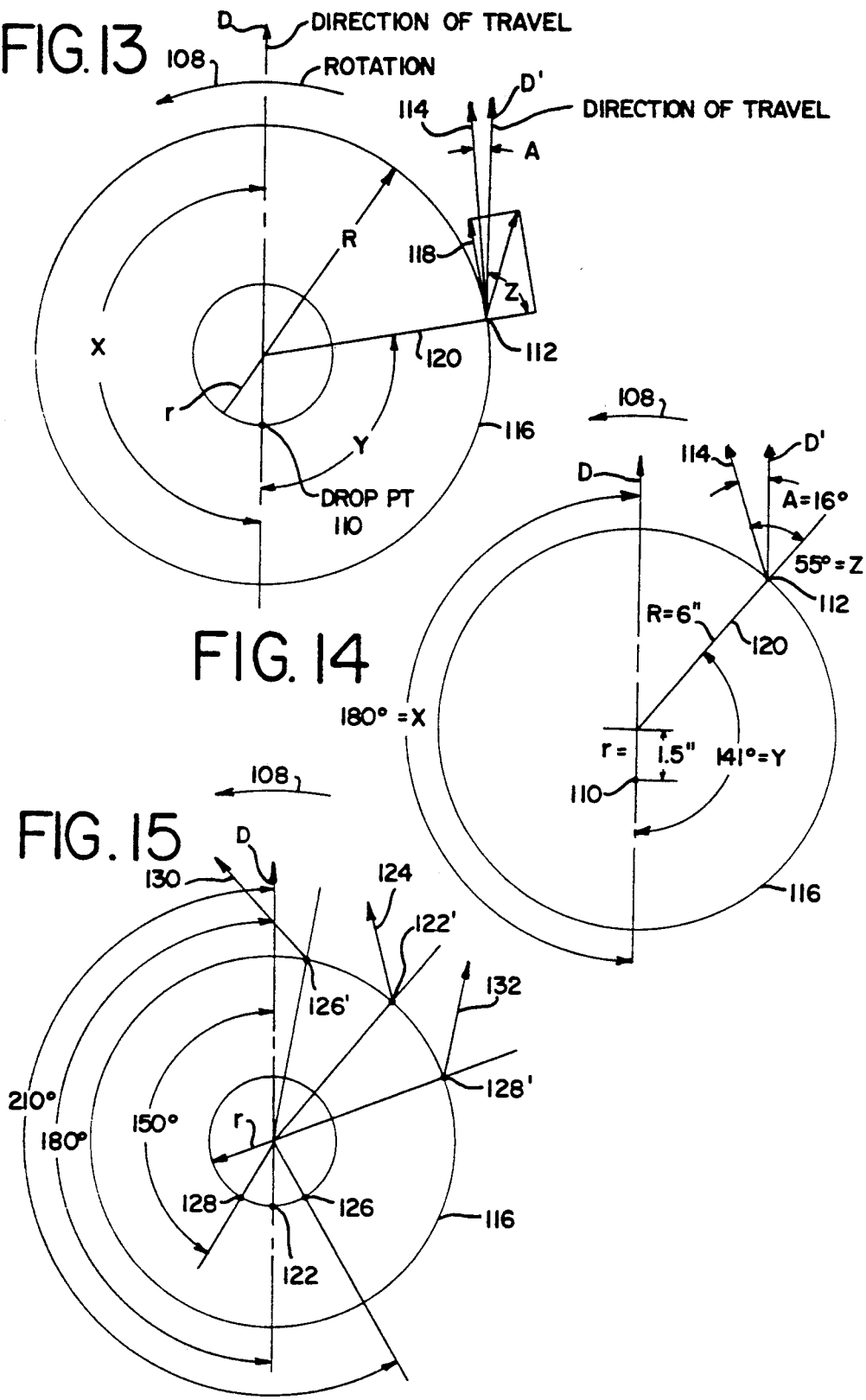

DUAL ROTARY IMPELLER BROADCAST SPREADERS

This is a of co-pending application Ser. No. 07/635,214 filed on Dec. 28, 1990 now abandoned.

BACKGROUND OF THE INVENTION

1. FIELD OF THE INVENTION

The present invention relates to agricultural spreaders of the broadcast type and, more particularly, to dual rotary impeller broadcast spreaders for the distribution of particulate or granular materials such as fertilizers, pesticides, seeds and the like.

2. DESCRIPTION OF THE INVENTION

Various dual rotary impeller broadcast spreaders have been disclosed heretofore. For example, U.S. Pat. Nos. 1,769,302; 2,474,065; 2,537,913; 2,958,530; 2,989,314; 3,085,807 and 3,109,657 show versions of such devices which employ two rotating impellers to broadcast or discharge particulate material deposited on the impellers beyond the spreader to cover a region wider than the dimensions of the spreader. In these devices, one impeller is positioned on the left-hand side of the spreader as viewed from the rear of the device facing forwardly in the direction of advance of the spreader and the other impeller is positioned on the right-hand side of the spreader viewed in a similar manner. These left and right-hand impellers are positioned in coplanar, adjacent configurations. In the previously disclosed devices, the spreader is pulled or driven in a forward direction with the impellers rotating such that the particulate material is discharged in a rearwardly direction. Thus, in each of these prior devices, the direction of discharge of the particulate material is directly opposite to the direction of advance of the spreader. Accordingly, the relative rotational correspondence of the two impellers is different depending on whether the impeller rotation is viewed in the direction of spreader advance or in the direction of material discharge.

Specifically, when the left-hand impeller (as viewed from the rear of the device facing in the direction of spreader advance) rotates in a clockwise direction and the companion right-hand impeller rotates in a counterclockwise direction, the resulting rotational correspondence of the impellers (in the direction of material discharge) is away from one another. Such impeller rotation pattern results in the ejection of the particulates from the impeller surfaces in a non-uniform pattern across the intended coverage path or swath. Furthermore, when the impellers rotate in such manner, the coverage pattern is typically skewed to both sides of the spreader path. Accordingly, devices constructed with double rotary impellers demonstrating rotational correspondence wherein the impellers rotate away from one another, have been found to be incapable of providing an optimal spread or distribution pattern in a device of acceptable, commercially practical size.

Alternatively, when the left-hand impeller of the prior devices rotates in a counterclockwise direction as viewed from the rear of the device facing in the direction of spreader advance and the companion right-hand impeller rotates in a clockwise direction, the resulting rotational correspondence of the impellers (in the direction of material discharge) is toward one another. In prior devices exhibiting such rotational correspondence of the impellers, it has been necessary to construct the device in a manner such that the material drop position on the impeller is located at a position adjacent the forward lead edge of the spreader so that the particulate material will be discharged rearwardly of the spreader relative to the direction of advance of the device. Thus, the particular material drop position on the impellers of these prior devices is an essential feature thereof in order to achieve the desired material distribution or spread pattern. If the particulates are deposited on the impellers at different locations, the resulting coverage pattern achieved would not be optimal and, indeed, the material could be thrown into the operating mechanism of the device rather than being expelled outwardly therefrom.

Thus, it has been an inherent problem in the construction of dual rotary impeller spreader devices to achieve an optimal spread pattern of broadcast particulate material utilizing a controlled distribution pattern from each of the individual impellers so that an additive spreading effect is achieved from the two rotating members.

Further problems have been encountered in regard to the construction of dual rotary impeller broadcast spreaders concerning the arrangement of the material drop position on the impeller. In view of the fact that each of the prior devices has been constructed for movement in a forward direction with the discharge of material being in an opposite, rearward direction, it has been necessary to provide for the depositing of material onto the impellers at a position incapable of providing an optimal coverage or spread pattern in a forward spreader advance direction.

SUMMARY OF THE INVENTION

In response to the above-noted shortcomings of the prior art, the present invention has been developed. The invention provides a spreader including two adjacent impellers mounted for rotary movement to broadcast or spread granular or particulate materials such as fertilizers, herbicides, pesticides, seeds and the like in a manner such that the coverage or distribution pattern is essentially optimized. In this regard, the spreaders of the present invention are constructed in a manner such that the discharge from each of the two individual impellers is controlled to achieve an additive distribution effect from each of the individual impellers resulting in a desired pattern of material distribution or coverage over a target area or treatment path or swath while avoiding undesirable skewing patterns and essentially eliminating centrally located coverage voids.

The spreader includes a housing having means for driving the device in a forwardly advancing direction and for discharging particulate material in essentially the same forwardly advancing direction. The housing includes a storage chamber positioned over a pair of impellers or broadcast means. The storage chamber includes discharge outlets or ports for gravitational flow of particulate or granular material from the chamber onto the impellers, the outlets being positioned to apply the particulate or granular material onto each of the impellers at critical material drop positions thereon.

The impellers are structured and mounted adjacent one another to rotate in a common plane and in a manner such that material deposited thereon is broadcast or spread in a desired spread pattern lateral to and longitudinally forward of the device in the direction of spreader advance. The left-hand impeller (as viewed from the rear of the device facing in the direction of spreader advance) rotates in a clockwise direction and the companion right-hand impeller rotates in a counterclockwise direction so that the impellers rotate toward one another in the direction of spreader advance as well as in the direction of particulate material discharge.

In order to achieve desired, essentially optimal distribution patterns of the particulate material broadcast from the rotating impellers, it has been found that the material drop position of the particles deposited onto the impellers is critical. That is, as the material falls through the outlets onto the surface of the impellers, the radial position at which the material is deposited on the impellers is instrumental in determining the direction of material movement upon ejection of the particulates from the impeller and, thus, the coverage or distribution pattern of material on the target area.

As will be detailed hereinafter, in the construction of the spreaders of the present invention, it has been found that when impellers are employed which rotate toward one another as the spreader is moved in a forwardly advancing direction, an essentially optimal distribution pattern generally in the direction of spreader advancement can be achieved by structuring the spreader device so that the material drop position is located along a circular path lying a radial distance of between about 1 and 2 inches from the center of the impeller. The precise radial dimension from the center for a given spreader construction and the precise location of the intersecting point or points determining the particular drop point is selected by the spreader designer in accordance with the requirements concerning the points of exit of the material from each of the impellers and the path for broadcasting material across the surfaces of the impellers to exit paths from each impeller which avoid skewed material distribution patterns. In this regard, in a particularly preferred embodiment of this invention, a single drop point is located at the intersection of a circle lying at a radial distance of 1.5 inches from the center of each of the two impellers of the spreader and a chord of a 180 degree angle measured from a line representing the direction of advancing travel of the spreader. Such a device has been shown to broadcast or distribute particulate material along a non-skewed path with the discharge from the two individual impellers controlled to achieve an additive distribution effect which approximates an optimal material distribution pattern on the target area without undesirable central coverage voids.

Additionally, it has been found that multiple material drop points may be located on the impellers with good effect and to provide wider angular distribution of material from the impellers without adversely impacting the effectiveness of the spreader in providing desired, essentially optimal distribution patterns without skewing.

Accordingly, it is a general object of the invention to provide an improved dual rotary impeller broadcast spreader.

Another object of this invention is to provide a dual rotary spreader in which the two impellers rotate in opposite directions to broadcast particulate material deposited thereon in an essentially forward direction while the spreader is being advanced in a similar forward direction.

A further object of this invention is to provide a broadcast spreader having two impellers which rotate in rotational correspondence such that the material deposited on each impeller is ejected from such impeller in a predeterminable, controlled distribution pattern generally in the direction of spreader advance and in a manner such that when the contributions of both impellers are combined, the spreader provides even coverage of a target area.

A still further object is to provide a dual rotary impeller spreader device which provides an essentially optimal spread pattern of broadcast particulate material utilizing a controlled distribution pattern from each of the individual impellers so that an additive spreading effect is achieved from each of the two rotating members.

Other objects of the invention, in addition to those set forth above, will become apparent to one skilled in the art from the following description.

BRIEF DESCRIPTION OF THE DRAWINGS

FIG. 13 is a diagrammatic view illustrating the calculation of the direction of material movement upon ejection of particulate material from a counterclockwise rotating impeller expressed in terms of the angle of material movement with respect to the direction of travel of the spreading device of FIG. 1;

FIG. 14 is a diagrammatic view illustrating the direction of material travel for a constructive model of the spreading device of FIG. 1;

FIG. 15 is a diagrammatic view illustrating the effect of multiple drop points on the impeller in relation to the distribution pattern provided by the spreading device of FIG. 1;

DETAILED DESCRIPTION OF THE INVENTION

Figure 1:
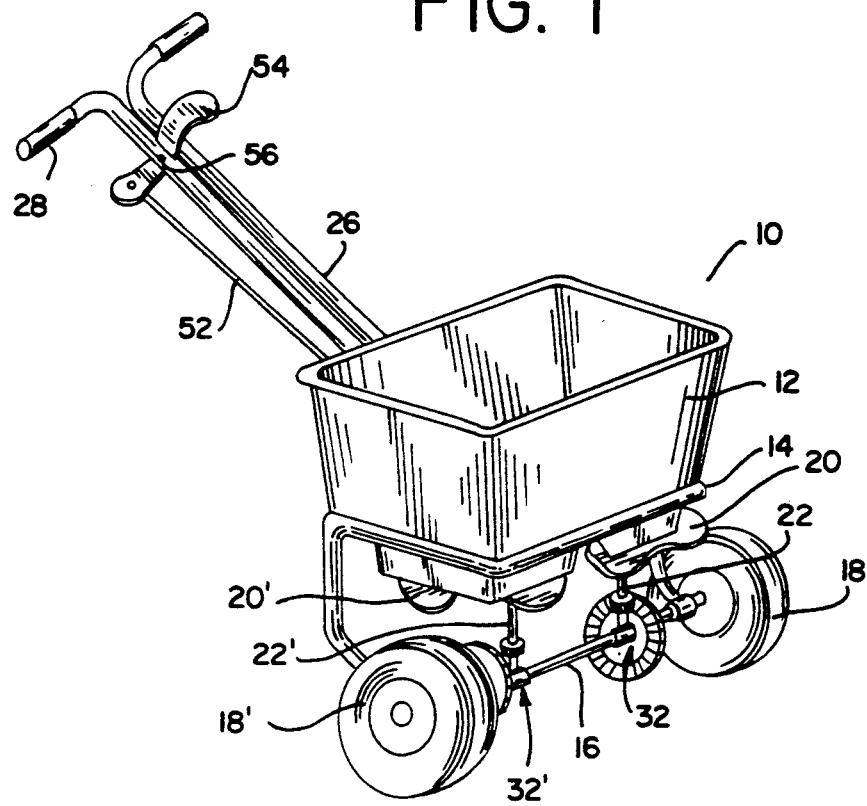
FIG. 1 is a perspective view of a spreading device in accordance with the present invention.
Figure 2:
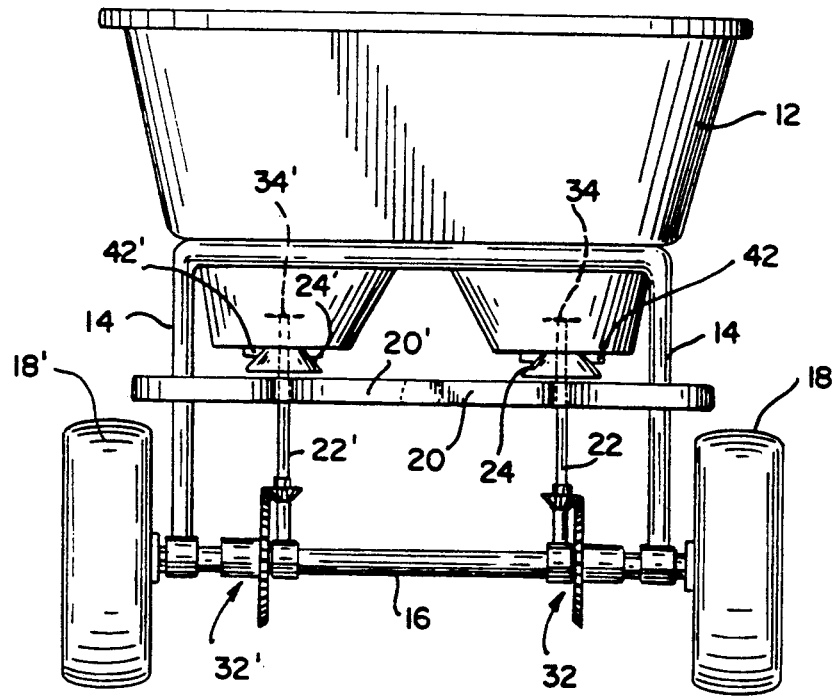
FIG. 2 is a front elevational view of the spreading device shown in FIG. 1 without the handle.
Figure 3:
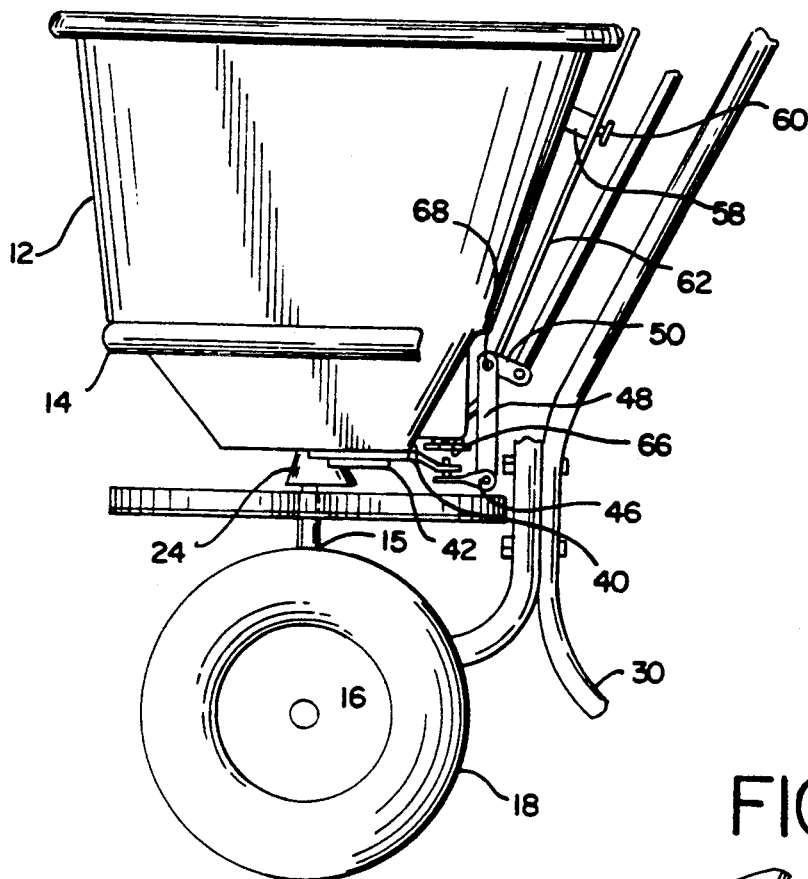
FIG. 3 is a side elevational view of a portion of the spreading device shown in FIG. 1.

Referring first to FIGS. 1-3, the rotary broadcast spreader of this invention generally designated by the numeral 10 comprises a storage chamber or hopper 12 for particulate material supported by a tubular inverted U-shaped frame 14, the sides of which are mounted on an axle 16. The axle 16 supports a pair of ground engaging wheels 18 and 18'. Broadcast means are provided comprising a pair of impellers 20 and 20', each being horizontally and fixedly mounted on a shaft 22, 22', respectively. Each of the shafts 22, 22' is rotatably driven at its lower end by a powered drive connection between the impellers 20, 20' and axle 16. In a most preferred embodiment of this invention, a pair of conically-shaped rotatable deflectors 24, 24' are axially and centrally mounted between hopper 12 and impellers 20, 20' with the wider dimension of each deflector facing the impeller. In the most preferred embodiment, these deflectors 24, 24' ensure correct positioning of material dropping from hopper 12 onto impellers 20, 20' However, in other embodiments, baffles, fixed deflectors or other suitable means may be used for this purpose, or the material may fall directly from the hopper 12 onto the impellers 20, 20', if so desired. Bolted to the inverted U-shaped frame 14 is a tubular member 26, the upper portion of which serves as a handle 28, the lower portion of which serves as a leg 30 to support the spreader when it is not being advanced. The axle 16 is journaled within inverted U-shaped frame member 14. Wheel 18' is fixedly connected to axle 16 for transmitting power to shafts 22, 22' by means of a set of bevel gears 32, 32' which rotate impellers 20, 20' as the spreader is advanced. A pair of agitators 34 and 34' are mounted on the upper portion of shafts 22, 22', respectively, within hopper 12 and rotate with the impellers 20 and 20'.

Figure 4:
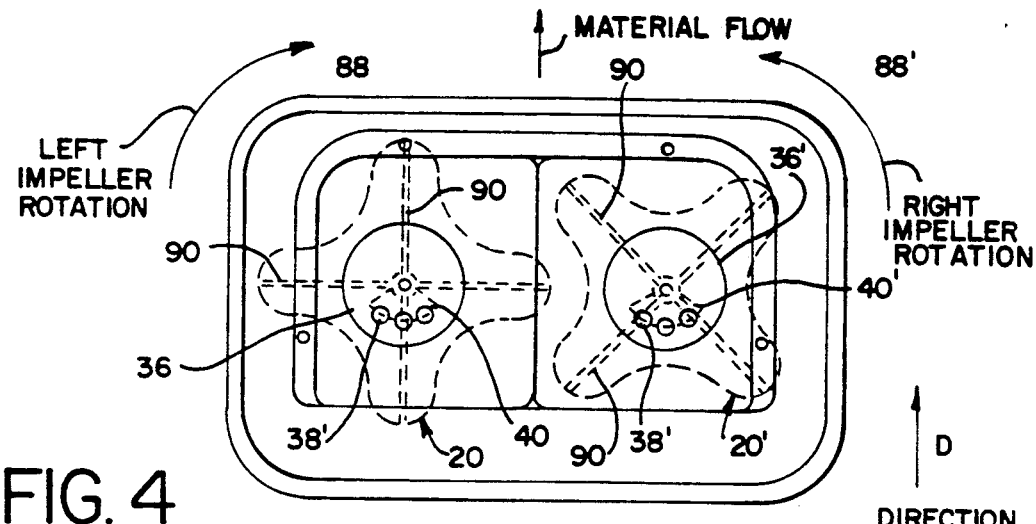
FIG. 4 is a top plan view of the storage chamber or hopper of the spreading device of FIG. 1.
Figure 5:
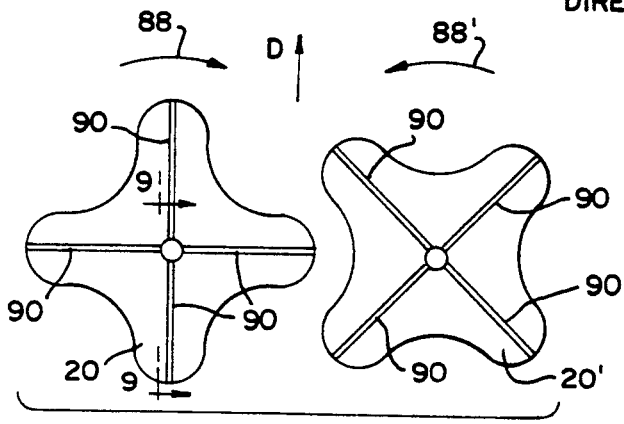
FIG. 5 is a top plan view of the two impellers of the spreading device shown in FIG. 1 illustrating the rotational correspondence between the impellers.
Figure 6:
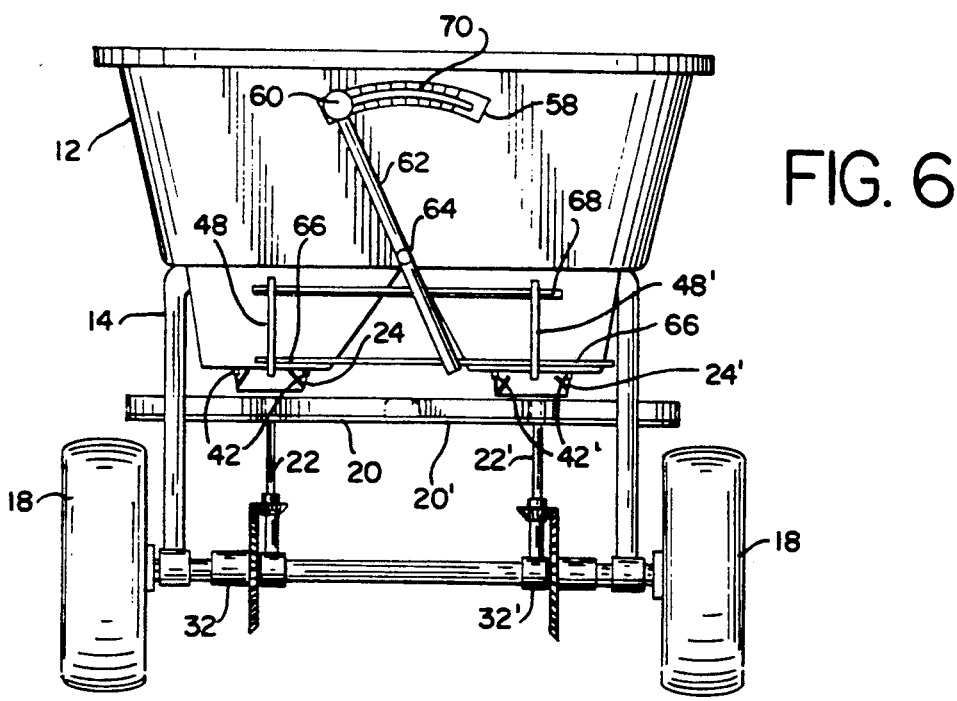
FIG. 6 is a rear elevational view of the spreading device shown in FIG. 1 without the handle.

As best illustrated in FIG. 4, particulate material is discharged from hopper 12 via discharge outlets generally designated by the numerals 36, 36'. Each of these outlets 36, 36' comprise a set of clustered discharge ports 38, 38' located off-center in the bottom portion of hopper 12. The amount of particulate material flowing through discharge ports 38, 38' is metered by adjustment of the size of the openings of ports 38, 38'.

Figure 3A:
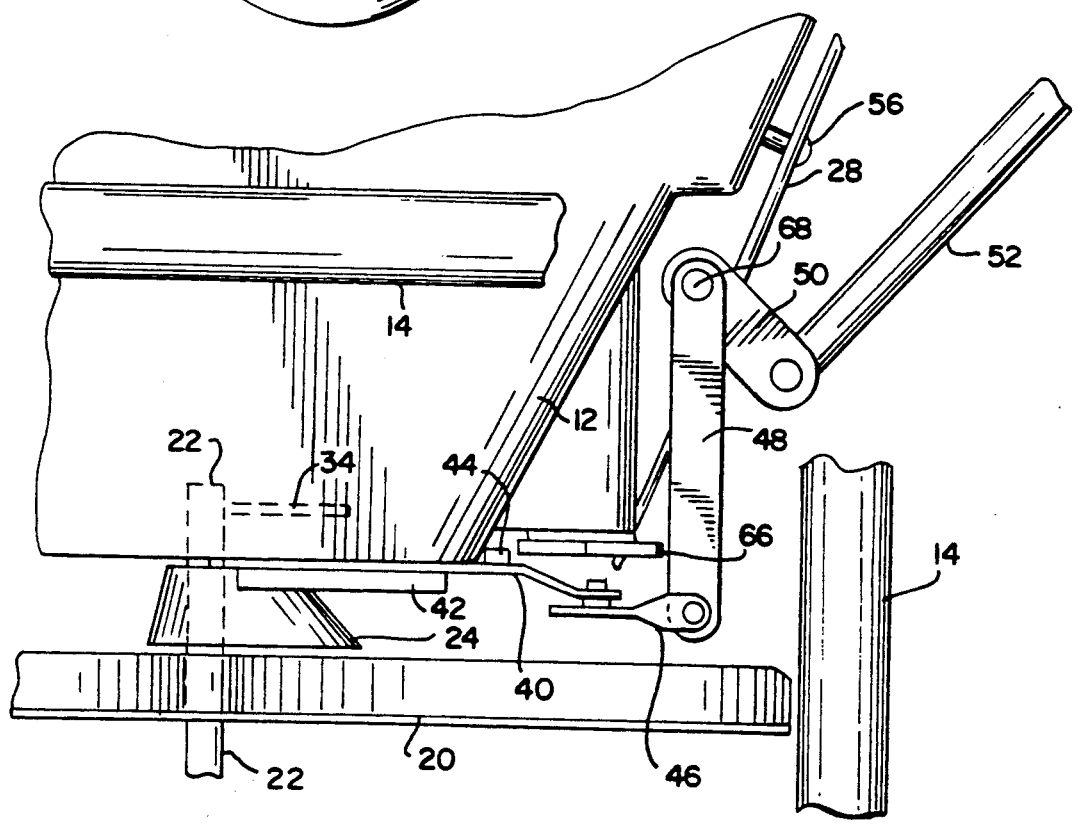
FIG. 3a is an enlarged fragmentary view of the actuating assembly of the spreading device shown in FIG. 1.

As is illustrated in FIGS. 3A and 4, the size of the openings of ports 38, 38' is controlled by a shut-off mechanism comprising shut-off plates 40, 40', guide plate 42, shut-off tab 44, pivot link 46, lever arms 48, 48', link 50, control rod 52, pivot lever 54, pivot member 56, rate plate 58, rate control knob 60, rate control lever 62 and its pivot 64, and rate control plate 66. Shut-off plates 40, 40', are respectively slidably mounted within guide plates 42, 42', mounted beneath hopper 12. Control rod 52 is attached at one end thereof via a connecting linkage means 50 to a pair of lever arms 48, 48'. The control rod extends outwardly at an angle generally following the tubular member 26 to the upper end of the handle 28 where it is attached to pivot lever 54 secured by the pivot member 56 to handle 28. The lever arms 48, 48' are pivotably connected to a horizontally extending rod member 68 which is fixedly attached to the hopper 12 so that the arms 48, 48' pivot about the axis of the rod 68 as a function of the operation of the control rod 52.

The lever arms 48, 48' are connected via additional linkage means 46, 46' with shut-off plates 40, 40', respectively, in a manner such that as the arms 48, 48' pivot about the rod 68, the plates 40, 40' are caused to move longitudinally thereby adjusting the extent of opening and closing of the ports 38, 38' in discharge outlets 36, 36' on the basis of the positioning of the plates 40, 40' relative to the port 38, 38'. Plates 40, 40' each have a stop 44 positioned thereon to engage a control plate 66 which is slidably mounted beneath the hopper 12. This plate 66 is operatively connected to an end section of a rate lever 62. The opposite end of lever 62 includes a control knob 60 which cooperates with an indexed rate plate 58 fixedly secured to the upper surface of the hopper 12. Markings or indicia 70 on the rate plate 58 correspond to predetermined positions of the control plate so that when control knob 60 is located opposite a particular marking on rate plate 58, rate lever 62 operates to repeatably and accurately position control plate 66 to the corresponding position. In turn, the position of control plate 66 determines how far in the open direction shut-off plates 40, 40' may move when actuated to their open position by control rod 52. Thus, the position of control knob 60 controls the effective size of the opening of ports 38, 38' in discharge outlets 36, 36'.

Figure 7:
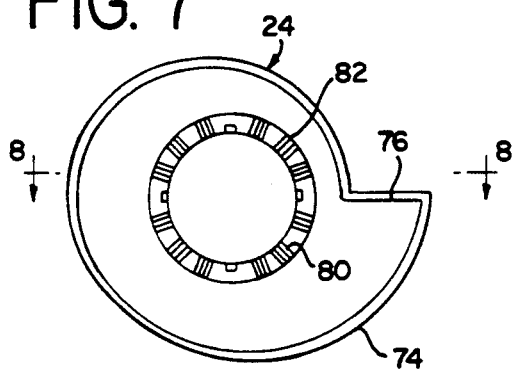
FIG. 7 is an enlarged view of the deflector shown in FIG. 1 as seen from the bottom.
Figure 8:
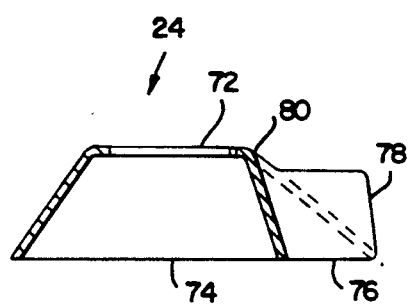
FIG. 8 is a cross-sectional view of the deflector taken along lines 8—8 of FIG. 7.

Deflectors 24, 24' are more clearly seen in FIGS. 7 and 8. The top portion 72 of each of the cone-shaped deflectors 24, 24' is circular while the bottom portion 74 is helical. Top circular portion 72 is concentric with its axis of rotation and with both shaft 22, and 22' around which it is rotatably adjustable. The portion of the helix at which the smallest radius meets with the largest radius forms a sharply angled surface 76 which has an extension 78. The extension acts as a handle to rotate the deflector for the purpose of adjustment. The bottom edge of each of the deflectors has a radius which gradually varies from a given value (on the inner extremity of surface 76) to a larger value (on the outer extremity of surface 76). The top portion of the deflector includes an annular surface 80 for holding the deflector in place against the bottom of the hopper. The annular surface 80 includes a plurality of striations 82 in its upper surface for engaging mating striations 84 in a bearing mount 86 attached to the bottom of the hopper.

Figure 9:
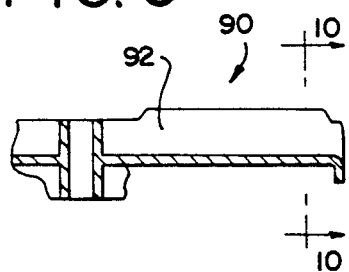
FIG. 9 is a cross-sectional view of a portion of one of the two impellers of the spreader device of FIG. 1 taken along the lines 9—9 of FIG. 5.
Figure 10:
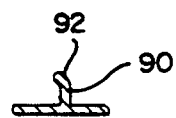
FIG. 10 is a cross-sectional view of a different portion of the impeller taken along lines 10—10 of FIG. 5.

The impellers 20, 20' are best illustrated in FIGS. 4-5 and 9-10. As identified in FIG. 4, and shown by arrows 88, 88' above FIG. 4, the left-hand impeller 20 rotates in the clockwise direction, and the right-hand impeller 20' rotates counterclockwise as the spreader is operatively moved in direction D. The impellers 20, 20' each have four straight radial fins 90 and 90'. The fins 90, 90' preferably include horizontal lips 92, 92', as shown in FIGS. 9-10, to reduce the amount of loss of particulate material bouncing off the impellers or over the fins.

Figure 11:
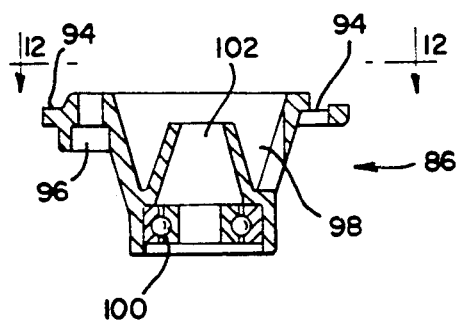
FIG. 11 is a cross-sectional view of a bearing mount used in the spreading device of FIG. 1.
Figure 12:
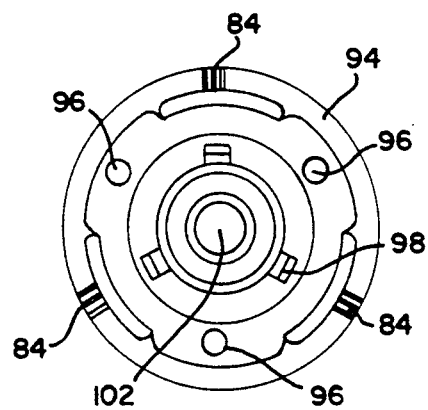
FIG. 12 is a top plan view of the bearing mount as viewed along the lines 12—12 of FIG. 11.

The deflectors 24, 24' are held in a fixed adjustable position beneath the discharge outlets 36, 36' of the hopper on shafts 22, 22' by means of a bearing mount 86, best shown in FIGS. 11 and 12. The bearing mount 86 has an outer ledge 94 which bears against the annular surface 80 of each of deflectors 24, 24' when the bearing mount is bolted in place to the underside of the hopper through threaded holes 96. The bearing mount includes a further set of three holes 98 to permit any particulate material that flows into the bearing mount 86 to exit therefrom. The bearing mount 86 also included an impeller bearing 100 providing for rotation of impellers 20, 20' on shafts 22, 22', respectively, during operation of the spreader 10. The shafts 22, 22' extend through an opening 102 in bearing mount 86, the opening having a diameter slightly larger than the shaft so that there is sufficient clearance to permit the shaft to rotate freely in the opening 102. The three sets of striations 84 on the surface of ledge 94 on the bearing mount mate with the complimentary sets of striations 82 (see FIG. 7) on the underside of and facing annular surface 80 on the top of deflectors 24, 24'. As the deflectors 24, 24' are adjusted to new radial positions, the mating striations 84, 82 serve to hold the deflectors 24, 24' in place.

Discharge outlets 36, 36' are aligned with respect to the deflectors such that particulate material is discharged onto the outer outwardly angled surface 76 of the deflectors 24, 24'. As the deflectors are rotated for purposes of adjustment, the bottom edge 74 of surface 76 in effect moves in or out radially over the impeller and the angle of the deflector surfaces change, becoming steeper at smaller radii. This permits adjustment of the radial position at which the dispensed material is loaded onto the impellers 20, 20'. As discussed hereinafter in greater detail, the position at which material is discharged onto impellers 20, 20' is particularly important in determining the resulting distribution pattern on the target surface. The deflectors are rotated to the smaller radial position for larger particle or higher density materials, and to larger radii for smaller particle or lower density materials.

In operation, an appropriate amount of material to be dispensed is loaded into hopper 12 of the inventive spreader. Shut-off plate control lever 54, and therefore shut-off plates 40, 40', are initially in their off positions, so that the openings of ports 38, 38' of discharge outlets 36, 36' are closed, and material is prevented from flowing from hopper 12 onto impellers 20, 20'.

The user selects the rate at which product is metered onto the impellers 20, 20' by adjusting control knob 60 to a setting represented by markings 70 on rate plate 58. Setting changes of control knob 60 are transmitted by rate lever 62 to control plate 66, with the maximum extent of travel of shut-off plates 40, 40' being controlled by stop element 44. This effectively controls the size of the openings of ports 38, 38' of discharge outlets 36, 36'. When it is desired to dispense product, the user may move shut-off plate control lever 54 to the open position. Movements of shut-off plate control lever 54 are transmitted to links 50, 48 via control rod 52. Links 50 and 48 thereby rotate as a unit about rod member 68. The rotation of links 50 and 48 is translated into a longitudinal movement via link 46 in order to slidably move shut-off plates 40, 40', thereby opening or closing ports 38, 38'. When shut-off plates 40, 40' have moved to their maximum desired open positions, as selected by the user via control knob 60, stop 44 engages control plate 66 precluding further movement of plates 40, 40' in their open directions.

In order to effect spreading of material by the inventive spreader, the user advances the spreader by pushing forward on handle 28, angularly rotating the unit slightly forward to displace leg 30 from its rest position on the ground. As the spreader advances in the direction D, wheels 18, 18' rotate due to frictional engagement with the ground, causing axle 16 to rotate. Axle 16 drives bevel gears 32, 32' which, in turn, drive shafts 22, 22'. When the spreader moves in the forward direction D, shaft 22 rotates clockwise, and shaft 22' rotates counterclockwise. Agitators 34, 34' and impellers 20, 20' are mounted on and rotate with shafts 22, 22', respectively.

As the spreader is advanced, agitators 34, 34' stir the particulate, powdered, or granular material in hopper 12, urging the material toward and through the ports 38, 38' of the discharge outlets 36, 36'. Material falling through the outlets falls on the outside angular surface 76 of deflectors 24, 24', and flows along this surface 76 until it reaches the bottom edge 74, from which it falls onto the surface of impellers 20, 20'. The radial position at which the material is deposited on the impellers 20, 20' is thus determined by the radius of helical edge 74 at the ports 38, 38'. The user may adjust this radius by rotating the cone-shaped deflectors 24, 24' to different angular positions, thereby moving a section of the angular surface 76 having a different bottom edge radius under discharge ports 38, 38'. The significance of the material drop position on the impellers 20, 20' is a critical feature of the present invention and will be discussed in detail hereinafter.

Material falls onto the upper surface of impellers 20, 20' which are rotating due to advancement of the spreader. Another critical feature of the present invention is the rotational correspondence of the impellers 20, 20'. Specifically, left-hand impeller 20 rotates in a clockwise direction, and right-hand impeller 20' rotates counterclockwise as the spreader is advanced in the direction D. Due to the rotation of impellers 20, 20', material carried thereon likewise rotates and is forced out to the periphery of the impellers' upper surface and ejected therefrom. Preferably, the material is ejected from each impeller in a predictable, controlled distribution pattern generally in the direction of spreader advancement D such that when the contributions of both impellers are combined, the spreader provides even coverage of the target surface.

The direction of material movement upon ejection from the impellers 20, 20' is a further critical feature of the present invention in assuring an appropriate distribution pattern of material on the target area. FIG. 13 shows the calculation of this direction for counterclockwise-rotating impeller 20' as expressed by the angle of material movement with respect to the direction of travel of the spreader. The calculations for clockwise-rotating impeller 20 are similar, but the angles are measured in the opposite direction.

The spreader direction of travel is indicated by arrows D and D'. Arrow 108 shows the direction of impeller rotation. Material is dropped onto the impeller at a drop point 110, and exits at an exit point 112 on the outer edge of the impeller, traveling after exit along a path indicated by arrow 114. The radius at the drop point 110 is represented by r, and the radius at the exit point is represented by R. Circle 116 represents the rotational path of exit point 112 (and would coincide with the outer impeller edge if the impeller were circular). Arrow 118 is tangent to circle 116 at exit point 112, and arrow 120 extends radially from the center of rotation through exit point 112 and is, therefore, perpendicular to tangent arrow 118.

Drop point angle (Angle X) indicates the angular position of the drop point 110 with respect to the spreader direction of travel D. Angle Y indicates the angular displacement of the impeller between the drop point 110 and the exit point 112. Exit angle (Angle Z) indicates the direction of travel of material exiting from the impeller with respect to the radial arrow 120. Angle A indicates the direction of particulate material travel with respect to the direction of spreader travel D'.

In designing the spreader 10, angle A is preselected for a given drop point 110 in order to provide a path for broadcasting material from the drop point 110 on the surface of the impellers 20, 20' along exit path 114 so as to avoid skewed material distribution patterns. Likewise, in order to avoid skewed distribution patterns emanating along exit path 114, angle X is preselected as a function of the placement of the discharge ports 38, 38'.

Also, angle Z is calculated from the equation:

$$\text{Angle } Z = \tan^{-1}[(MU^2+1)^{\frac{1}{2}} - MU]^{-1}$$

wherein MU is the kinetic coefficient of friction between the particle and the impeller. The value of the coefficient of friction is dependent on the material being applied and environmental factors, such as humidity.

Thus, since it can be seen that angle A is equal to the sum of the angles X, Y and Z; angle Y can be calculated from the equation:

$$\text{Angle } Y = \text{Angle } A - \text{Angle } X - \text{Angle } Z$$

Once angle Y has been determined, the drop point radius r can be calculated employing the equation:

$$r = R[\cosh Y[(MU^2+1)^{\frac{1}{2}} - MU]^{-1}$$

Therefore, the critical drop point 110 on the surface of the impellers 20, 20' onto which the material to be broadcast must be deposited in order to achieve a nonskewed pattern of distribution will lie at the intersection of the drop point radius r and a chord of the angle X which has been preselected for use herein.

FIG. 14 shows an example of the calculation of the direction of material travel for a constructive model of the invention having a single drop point and including the following design parameters as independent variables:

X = 180 degrees
R = 6 inches
Z = 55 degrees
A = 16 degrees
MU = 0.375

After applying appropriate unit conversions, the following results are calculated from the above formulae:

Y = 141 degrees
r = 1.5 inches

These results predict that material placed on the impeller 1.5 inches behind the impeller center will be ejected at an angle of 16 degrees to the left of the spreader direction of travel.

Through experimentation and theoretical calculations, it has been determined that values of r varying between 1 and 2 inches, and values of R varying between 4 and 10 inches, and values of MU varying between 0.375 and 0.7 produce acceptable results. In particular, it is noted that 2 inches appears to be an upper practical limit for r. Above this value, the amount of effort needed to advance the spreader becomes excessive. In addition, environmental factors, especially humidity, cause MU to vary over time even when the formulation of the material being dispensed remains identical. In a spreader constructed according to the present invention, the operator may use deflectors 24, 24' to adjust the drop point radius r to compensate for variation in friction coefficient due to product variation and because the impellers 20 and 20' rotate toward each other in the direction of travel they will compensate each other because of decreased variation in the fraction coefficient due to humidity and other factors.

In order to provide a wider distribution of material, multiple drop points may be used as in the preferred embodiment discussed above. The effect of multiple drop points is shown in FIG. 15. A first drop point 122 is shown in the same position as the single drop point 110 of FIG. 14 (i.e. X = 180 degrees, r = 1.5 inches). The corresponding exit point 122' and direction of travel arrow 124 are shown. A second drop point 126 is located 30 degrees counterclockwise from the first drop point 122 at the same distance from the center (X = 210 degrees). A third drop point 128 is located 30 degrees clockwise from the first drop point 122 at the same distance from the center (X = 150 degrees). As shown by exit direction arrow 130, the 30 degree counterclockwise displacement of the second drop point 126 causes material to exit at an angle 30 degrees further counterclockwise than the material dropped at the first drop point 122. In addition, second exit point 126' is displaced 30 degrees further counterclockwise than first exit point 122'. Similarly, exit direction arrow 132 indicates that the 30 degree clockwise displacement of the third drop point 128 causes material to exit at an angle 30 degrees further clockwise than the material dropped at the first drop point 122. Accordingly, third exit point 128' is displaced 30 degrees further clockwise than first exit point 122'. Thus, providing multiple drop points provides a wider angular distribution of material from the impellers.

FIGS. 16-19 show that a spreader constructed according to the invention performs advantageously compared to prior art spreaders. In normal operation, spreader users apply material to a target area by operating the spreader along a plurality of substantially parallel paths across the region, each path being offset from its neighboring paths by an amount determined by how widely the spreader distributes an effective amount of material. Ideally, a spreader should distribute material reasonably uniformly within the intended coverage region (swath), and should minimize the amount of material spuriously distributed outside the intended swath. In addition, in order to enable the user to select an appropriate path along which to operate the spreader, the coverage swath should be centered on the path of the spreader.

Figure 16:
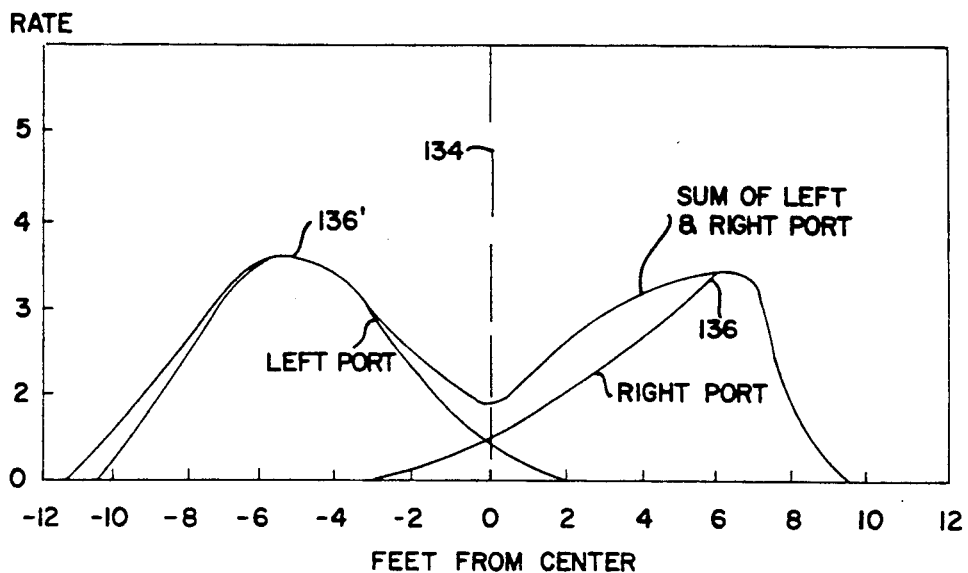
FIG. 16 illustrates graphically a distribution pattern of particulate material applied to a target area by operation of a single rotary impeller spreading device of the prior art.

Prior art spreaders suffer from the disadvantage that their coverage is highly non-uniform across the intended coverage swath and that their coverage is typically skewed to both sides of the spreader path. Such a coverage pattern obtained by experiment with a prior art spreader is shown graphically in FIG. 16. The graph shows the relative distribution rate measured at various distances from the centerline 134 of the spreader path. Large, narrow peaks 136, 136' about five feet left and right of the centerline dominate the distribution curve, indicating that a disproportionate amount of material is distributed in these regions. The sum of the curves causes a shallow area 138 in the center of the spreader path. This distribution is undesirable, both because it is substantially non-uniform, and because substantially more material is distributed on the left and right side (i.e. the pattern is skewed). Skewing increases at high humidity, because the coefficient of friction between the material and the impeller increases, causing the material to remain longer on the impeller. As a result of these disadvantages, when the prior art spreaders of FIG. 16 are used, for example, to apply fertilizers to lawns, noticeable patterns of varying green coloration between swaths are produced. In some cases, burning occurs due to over application.

Figure 17:
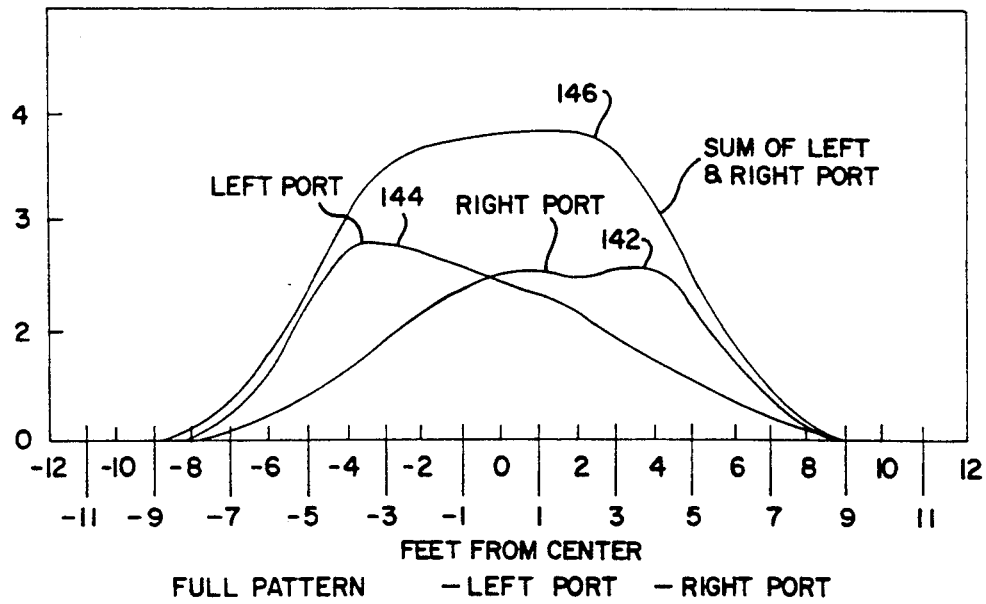
FIG. 17 illustrates graphically a distribution pattern of particulate material applied to a target area by operation of a constructive model of a dual rotary impeller spreader of the present invention.

FIG. 17 shows the distribution pattern of a constructive model of a spreader according to the present invention. The material distribution pattern due to the right-hand impeller 20' is shown by line 142, and the distribution pattern due to the left-hand impeller 20 is shown by line 144. Line 146 indicates the distribution pattern of the spreader as a whole, taking into account both impellers 20, 20'. It can be seen from the individual distribution curves that the distribution from right impeller 20, which rotates counterclockwise, is skewed to the left side of the spreader path, and that the distribution from the left impeller 20, which rotates clockwise, is skewed to the right side of the spreader path.

While the distribution patterns 144, 142 of the individual impellers are somewhat skewed and non-uniform, the combined distribution pattern 146 of the spreader as a whole is substantially uniform and substantially non-skewed. This advantageous distribution pattern results from the inventive use of two impellers rotating towards one another such that material deposited on the impellers is carried on the portion of the impeller nearest the outside edge of the spreader. While dual impeller spreaders with different impeller rotation schemes are known, the performance of such spreaders is less advantageous.

Figure 18:
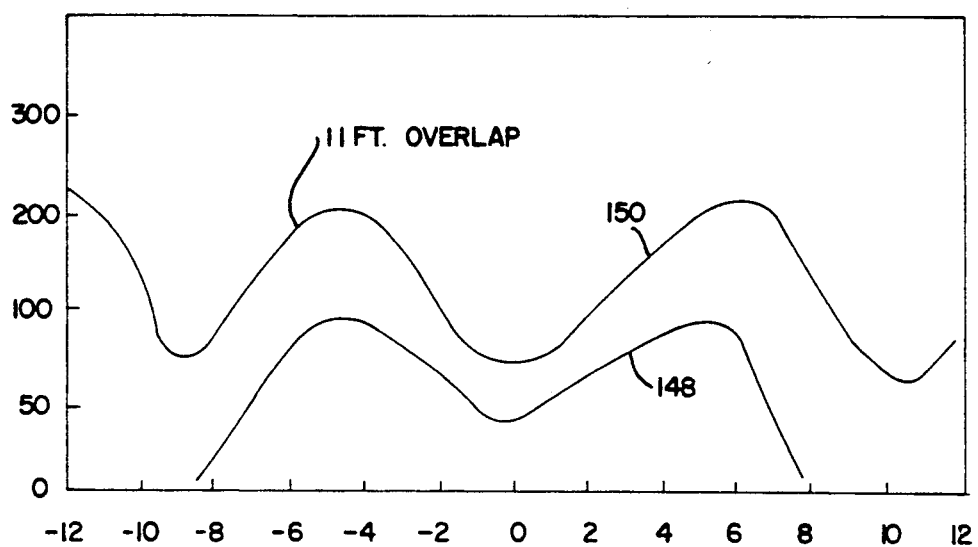
FIG. 18 illustrates graphically a distribution pattern of particulate material applied across two parallel, adjacent application swaths, 11 feet apart by operation of a dual rotary impeller spreading device of the prior art.

FIG. 18 shows the distribution pattern of the prior art spreader of FIG. 16 across two parallel, adjacent application swaths, 11 feet apart. The distribution pattern 148 for a single swath is shown, along with the combined distribution 150 for two adjacent swaths. The pattern shows the effect of overlap between adjacent swaths. The pattern is characterized by large peaks indicating significant variation in the amount of material distributed depending on the distance from the centerline of the swath, even when overlapping coverage from adjacent swaths is taken into account.

Figure 19:
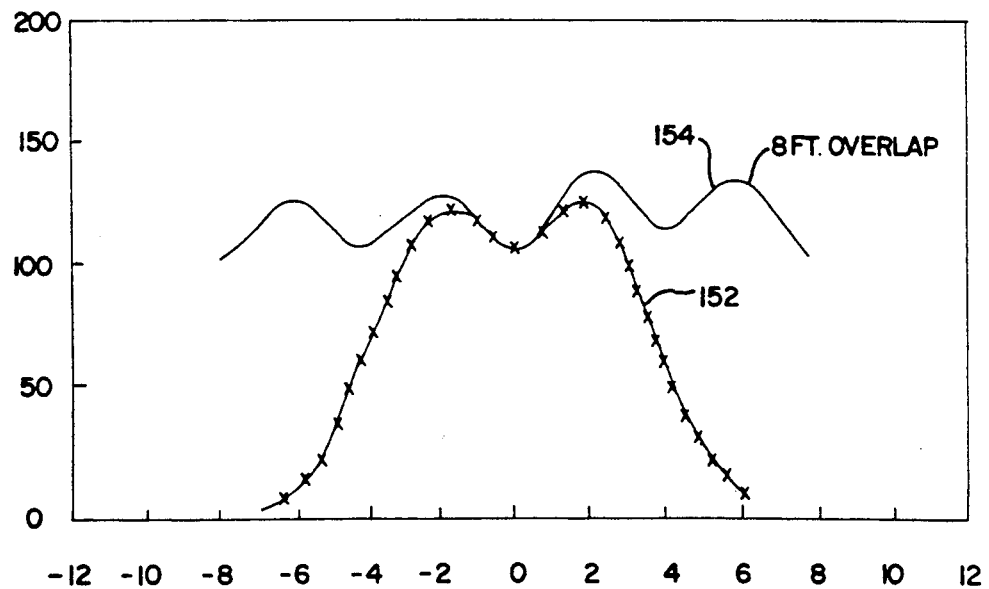
FIG. 19 illustrates graphically a distribution pattern of particulate material applied across three parallel, adjacent application swaths, 8 feet apart by operation of a constructive model of a dual rotary impeller spreading device of the present invention.

FIG. 19 shows the distribution pattern of a constructive model of a spreader according to the present invention across three parallel, adjacent application swaths, 8 feet apart (the difference in offset distance between FIGS. 18 and 19 are due to differences in the intended width of the coverage swaths between the two spreaders). The distribution pattern 152 for a single swath is shown, along with the combined distribution 154 for the three adjacent swaths. While distinct peaks are noticeable, the magnitude of the variations is less than one half that of the prior art spreader shown in FIG. 18.

The rotary spreader of the invention provides a distribution system for particulate material having a smooth distribution pattern without significant peaks or skewing. It also provides adequate and convenient pattern adjustment for a wide range of material types. Moreover, the spreader rate and pattern mechanism are greatly simplified as compared to prior systems offering comparable performance.

While there have been described what are at present considered to be the preferred embodiments of the invention, it will be understood that various modifications may be made therein, and it is intended to cover in the appended claims all such modifications as fall within the true spirit and scope of the invention.

I claim:

1. A spreader for broadcasting particulate materials in a controlled distribution pattern onto a selected target area comprising:
    a housing;
    means for driving said housing in a forwardly advancing direction;
    first and second impellers mounted on said housing in adjacent alignment for rotary motion about their respective central axes, said impellers rotating in rotational correspondence toward one another as said housing is driven in said forwardly advancing direction;
    said housing having means for storing said particulate materials and for depositing said materials onto at least one material drop position located on a top surface of each of said impellers along a circular path lying a radial distance of between about 1 to about 2 inches from said central axis of each of said impellers;
    said impellers being structured and positioned in a manner such that said rotation thereof in said rotational correspondence as said housing is driven in said forwardly advancing direction causes said particulate materials deposited thereon to be broadcast therefrom in a controlled distribution pattern generally in the direction of spreader advancement as said spreader is driven in a forwardly advancing direction and in a manner such that an additive spreading effect is achieved from the two rotating impellers providing an even coverage of said target area.

2. The spreader of claim 1 wherein one said material drop position lies at the intersection of a radial line defining said radial distance from said central axis and a chord of a drop point angle defining the angular position of said drop point with respect to said forwardly advancing direction.

3. The spreader of claim 2 wherein said drop point angle is a 180 degree angle.

4. The spreader of claim 1 wherein said particulate materials are broadcast from each of said impellers along an exit path which extends from an exit point at the outer edge of the impeller at an exit angle which defines the direction of travel of material exiting from the impeller with respect to a radial line from the central axis to said exit point so as to avoid skewed distribution patterns.

5. The spreader of claim 4 wherein said exit angle is calculated from the equation:

$$Exit\ Angle = \tan^{-1}[(MU^2+1)^{\frac{1}{2}} - MU]^{-1}$$

wherein MU is the kinetic coefficient of friction between the particulate materials and the impeller.

6. The spreader of claim 5 wherein MU is between 0.375 and 0.7.

7. The spreader of claim 1 wherein said means for storing said particulate materials comprises a hopper positioned above said impellers whereby said materials are deposited onto said impellers by gravitational flow.

8. The spreader of claim 7 wherein said means for depositing said materials onto said impellers comprises at least one discharge outlet formed in the bottom portion of said hopper.

9. The spreader of claim 8 wherein said means for depositing said materials includes a shut-off mechanism comprising shut-off plates slidably mounted beneath said hopper for adjusting the extent of opening and closing of said discharge outlet.

10. The spreader of claim 9 wherein said shut-off plates include stop means positioned thereon to engage control means slidably mounted on said hopper in a manner such that the movement of said shut-off plates in the open direction is controlled in response to the setting of said control means whereby the effective size opening of said discharge outlet is controlled.

11. The spreader of claim 1 wherein said means for depositing said materials onto said impellers includes a conically shaped deflector axially mounted between said housing and said impellers.

12. The spreader of claim 2 wherein said radial distance from said central axis is calculated from the equation:

$$Radial\ Distance = R[\cosh Y[(MU^2+1)^{\frac{1}{2}} - MU]^{-1}$$

wherein R is the radial distance from the central axis of said impeller to an exit point at the outer edge of the impeller; MU is the kinetic coefficient of friction between the particulate materials and the impeller; and Y is an angle indicating the angular displacement of the impeller between the drop point and the exit point.

13. The spreader of claim 12 wherein said angle Y is calculated from the equation:

$$Angle\ Y = Angle\ A - Angle\ X - Angle\ Z$$

wherein Angle A indicates the direction of particulate material travel with respect to the forwardly advancing direction of spreader travel; Angle X is said drop point angle; and Angle Z indicates the direction of travel of particulate material exiting from the impeller with respect to a line extending radically from the central axis through the exit point.

14. The spreader of claim 12 wherein Angle Y is a 141 degree angle; R is between 4 and 10 inches and MU is between 0.375 and 0.7.

15. The spreader of claim 12 wherein MU is between 0.375 and 0.7.

16. A spreader for broadcasting particulate materials in a controlled distribution pattern along a predetermined distribution path comprising:
a housing;
means for driving said housing in a forwardly advancing direction;
a first impeller mounted on said housing for rotary motion about a central axis thereof and a second impeller mounted on said housing for rotary motion about a central axis thereof, said impellers being positioned in adjacent alignment within a common horizontal plane;
said first impeller rotating in a clockwise direction and said second impeller rotating in a counterclockwise direction so that said impellers rotate towards one another as said housing is driven in said forwardly advancing direction;
said housing having means for depositing said particulate materials onto at least one material drop position located on each of said impellers along a circular path lying a first radial distance from said central axis of each of said impellers, said first radial distance being calculated from the equation:

$$First\ Radial\ Distance = R[\cosh Y[(MU^2+1)^{\frac{1}{2}} - MU]]^{-1}$$

wherein R is the radial distance from the central axis of said impeller to an exit point at the outer edge of the impeller; MU is the kinetic coefficient of friction between the particulate materials and the impeller; and Y is an angle indicating the angular displacement of the impeller between the drop point and the exit point;
said rotation of said impellers causing said particulate materials deposited thereon to be ejected from said impellers in a controlled distribution pattern generally in the direction of spreader advancement as said spreader is driven in a forwardly advancing direction.

17. The spreader of claim 16 wherein a first one of said material drop positions lies at the intersection of a radial line defining said first radial distance from said central axis and a chord of a drop point angle defining the angular position of said drop point with respect to said forwardly advancing direction.

18. The spreader of claim 17 wherein two additional material drop positions lie along said circular path said first radial distance from said central axis, one of said additional drop positions being located 30 degrees counterclockwise of said first material drop position and the other said additional drop position is located 30 degrees clockwise of said first drop position.

19. The spreader of claim 17 wherein said first radial distance from said central axis to said circular path is about 1 to about 2 inches.

20. The spreader of claim 17 wherein said Angle Y is calculated from the equation:

$$Angle\ Y = Angle\ A - Angle\ X - Angle\ Z$$

wherein Angle A indicates the direction of material travel with respect to the direction of spreader travel; Angle X indicates the angular position of the drop point with respect to the direction of spreader travel; and Angle Z indicates the direction of travel of particulate material exiting form the impeller with respect to a line extending radially from the central axis through the exit point.

21. The spreader of claim 17 wherein said particulate materials are ejected from each of said impellers along an exit path which extends generally from an exit point at the outer edge of the impeller at an exit angle which defines the direction of travel of material exiting from the impeller with respect to a radial line from the central axis to said exit point.

22. The spreader of claim 21 wherein said exit angle is calculated from the equation:

$$Exit\ Angle = \tan^{-1}[(MU^2+1)^{\frac{1}{2}} - MU]^{-1}$$

wherein MU is the kinetic coefficient of friction between the particulate materials and the impeller.

23. The spreader of claim 16 wherein R is between 4 and 10 inches and MU is between 0.375 and 0.7.

24. The spreader of claim 23 wherein Angle Y is a 141 degree angle.

25. The spreader of claim 21 wherein said exit angle is a 16degree angle.

26. The spreader of claim 17 wherein said drop point angle is a 180 degree angle.

27. The spreader of claim 26 wherein the radial distance of said circular path from said central axis is 1.5 inches.

* * * * *

UNITED STATES PATENT AND TRADEMARK OFFICE
CERTIFICATE OF CORRECTION

PATENT NO. : 5,203,510
DATED : April 20, 1993
INVENTOR(S) : Steve P. Courtney, James D. Amerine It is certified that error appears in the above-indentified patent and that said Letters Patent is hereby corrected as shown below:

Column 9, line 27, after "MU" and before "]" insert --]--

Column 14

Claim 25, line 62, delete "16degree" and insert --16 degree--

Signed and Sealed this

Twenty-eight Day of February, 1995

Attest:

BRUCE LEHMAN

*Attesting Officer*            *Commissioner of Patents and Trademarks*